US005590988A

United States Patent [19]

Rusconi

[11] Patent Number: 5,590,988

[45] Date of Patent: Jan. 7, 1997

[54] PLUNGE TYPE ROUTER

[75] Inventor: Maurizio Rusconi, Lecco, Italy

[73] Assignee: Black & Decker Inc., Newark, Del.

[21] Appl. No.: 397,462

[22] Filed: Mar. 2, 1995

[30] Foreign Application Priority Data

Mar. 2, 1994 [GB] United Kingdom .................. 9404003

[51] Int. Cl.$^6$ .................................................. B23C 1/20

[52] U.S. Cl. .................. 409/182; 144/136.95; 144/154.5

[58] Field of Search .................................. 409/175, 178, 409/179, 180, 181, 182, 134, 231; 144/134 D, 136 C

[56] References Cited

U.S. PATENT DOCUMENTS

| | | | |
|---|---|---|---|
| 4,827,996 | 5/1989 | Cotton et al. | 409/182 |
| 5,191,968 | 3/1993 | McCurry | 409/182 |
| 5,207,253 | 5/1993 | Hoshino et al. . | |
| 5,273,089 | 12/1993 | Fuchs et al. . | |
| 5,346,342 | 9/1994 | Winchester | 144/136 C |

FOREIGN PATENT DOCUMENTS

| | | |
|---|---|---|
| 828012 | 8/1975 | Belgium . |
| 1652698 | 4/1971 | Germany . |
| 1048938 | 11/1966 | United Kingdom . |
| 1162796 | 8/1969 | United Kingdom . |
| 2070513 | 9/1981 | United Kingdom . |

*Primary Examiner*—Daniel W. Howell
*Attorney, Agent, or Firm*—Dennis A. Dearing; John D. Del Ponti; Charles E. Yocum

[57] ABSTRACT

A plunge-type router comprising a motor housing having a driving motor provided therein, a base having a workpiece-engaging flange member and a support plate axially movable with respect to the flange member along substantially perpendicular guide means, the support plate being biassed away from the flange member and provided with a bore to receive the motor housing and clamping means to secure the housing in the bore, and locking means effective to prevent undesired separation of the motor housing from the support plate.

The potential hazard presented to the operator by accidental separation of the motor housing from the base is thereby avoided.

9 Claims, 3 Drawing Sheets

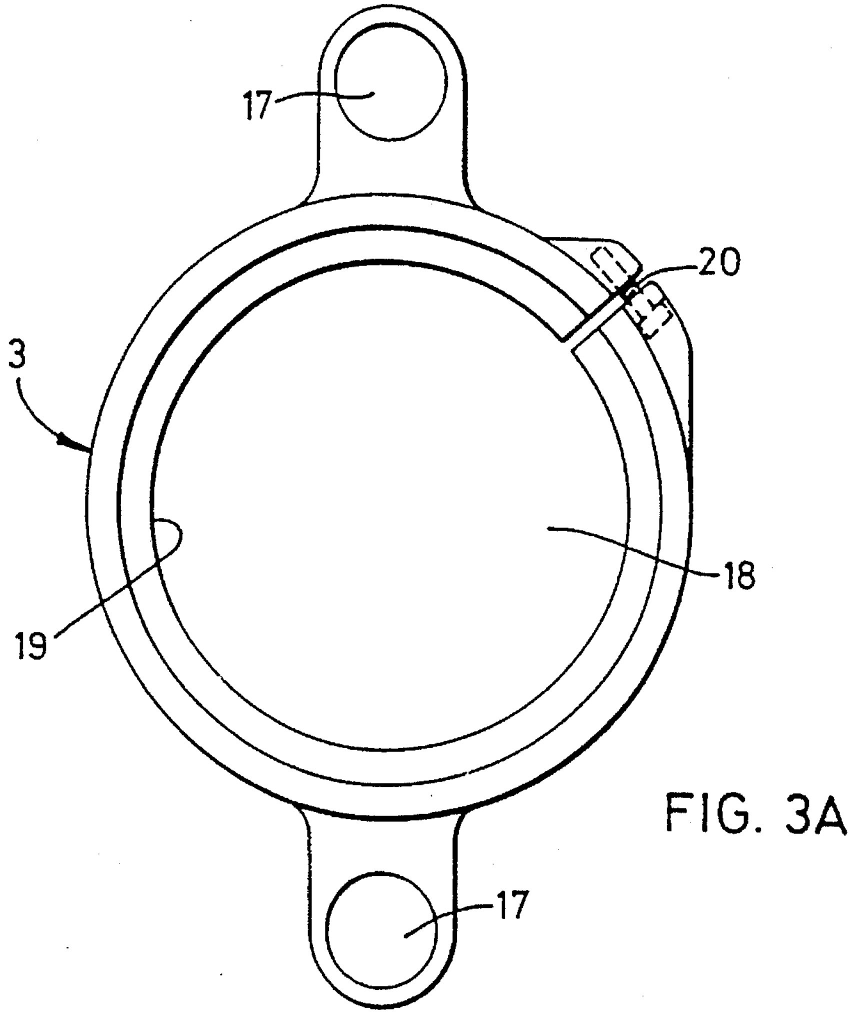
FIG. 3A
FIG. 3B
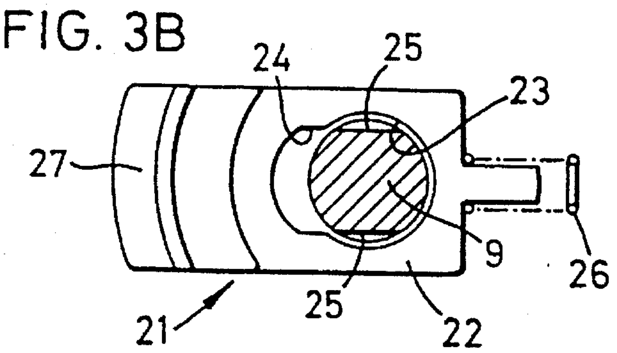
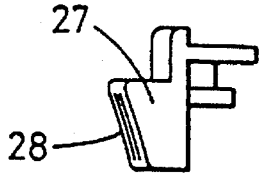
FIG. 4

PLUNGE TYPE ROUTER

The present invention relates in general to hand-operated routers and in particular to plunge-type routers wherein the driving motor and cutting tool are movable reciprocally with respect to a workpiece-engaging base.

Plunge type routers are similar to conventional routers in that they include a driving motor having a bit or cutting tool holding chuck secured to one end of the motor drive shaft, which motor is axially movably supported with a base housing. However, while in conventional non-plunge type routers the motor is locked in position relative to the base housing such that the cutting tool or bit projects axially outwardly from the workpiece engaging surface of the base housing to the desired depth of cut at all times, the plunger type routers provide biasing means which operate to retract the cutting tool or bit into the base housing during periods of non-use. In order to enable the router to be "plunged" to the desired cutting depth, such plunge type routers are also commonly provided with adjustable depth stop systems and may also include means for locking the motor housing at preselected positions such as the cutting depth.

In one common construction for plunge type routers, the motor housing is movably positioned and supported on a pair of guide bars extending generally perpendicularly upwardly from a workpiece-engaging flange member.

The motor housing, which is generally of cylindrical construction, is received within a central bore of a support plate which is slidably mounted on the guide bars and biased away from the workpiece-engaging flange member.

Generally, clamping means are provided in order to secure the motor housing in the bore of the support plate. For example, the clamping means may comprise means to alter the diameter of the bore, operable so as to exert a clamping force on the motor housing extending therethrough.

The motor housing contains the motor, typically an electric motor, with its associated controls. A drive shaft operably connected to the motor extends through one end of the motor housing in the direction of the workpiece-engaging flange member and terminates in a chuck which is adapted to receive and hold the cutting tool or bit. When the router is plunged, the bit is moved against the biassing action and through a central bore in the workpiece-engaging flange member, to engage the workpiece itself.

In order to facilitate the securing and replacement of bits in the chuck, it is known to provide means for impeding the rotation of the motor drive shaft, such that force may be exerted on the chuck in order to tighten or loosen its hold on the bit. For example, the drive shaft may be provided with a flat which may be engaged by locking means to prevent the shaft rotating. Typically, such locking means comprise a flat-engaging member operable from a position in which it does not come into contact with the drive shaft to a position in which it intersects the drive shaft tangentially co-operating with the flat, thereby impeding rotation of the shaft. The flat-engaging member is biassed away from the intersecting position and is typically pushed into engagement with the shaft by the application of pressure against the biassing means, for example by depressing a button on the exterior of the motor housing.

A disadvantage of plunge-type routers as described above is that, during the routing operating, vibration of the unit may lead to loosening of the clamp means which retain the motor housing in the support plate. This can lead to undesired movement of the bit with respect to the workpiece and possibly also the release of the motor housing from the base, which presents a hazard to the operator. The present invention reduces the extent to which the bit will move with respect to the workpiece in the event that the clamping means should loosen, and eliminates the hazard to the operator caused by undesired separation of the motor housing from the base.

According to a first aspect of the invention, there is provided a plunge-type router comprising a motor housing having a driving motor provided therein, a base having a workpiece engaging flange member and a support plate axially movable with respect to the flange member along substantially perpendicular guide means, the support plate being biassed away from the flange member and provided with a bore to receive the motor housing and clamping means to secure the housing in the bore, and locking means effective to prevent undesired separation of the motor housing from the support plate.

Preferably, the locking means comprises a tab extending radially from the motor housing so as to prevent movement of the housing through the bore in the support plate when the clamping means are disengaged. Optionally, a plurality of tabs may be provided.

Preferably, when the router is assembled, the tab is located between the support plate and the workpiece-engaging flange member, and is movable from an extended position into a retracted position in which the housing may be withdrawn from the support plate.

Advantageously, the tab is biassed into the extended position and may be moved into the retracted position by depressing it radially inwardly with respect to the motor housing.

Preferably, the tab is biassed into the extended position by a helical spring located within the motor housing.

In a preferred embodiment, the tab is tapered in order to allow the motor housing to be pushed into the bore of the support plate. When the housing is first offered up to the bore, the tapered surface of the tab engages with the inner surface of the bore. The act of inserting the motor housing in the bore displaces the tab radially towards its retracted position, allowing the housing to slide freely through the bore. When the tab has passed through the bore, the biassing means return it to the extended position, such that the housing cannot be removed from the bore.

In a particularly preferred embodiment of the invention, the tab is formed as an extension of a motor drive shaft locking means control.

Preferably, the drive shaft locking means comprise a flat-engaging member which is movable from a free position into a locking position in which it engages a flat on the motor drive shaft and prevents its rotation. Advantageously, the flat-engaging member may engage two radially opposed flats on the drive shaft.

The flat-engaging member is biassed into the free position and operable into the locking position by radially depressing a button on the exterior of the motor housing. In a preferred embodiment of the invention, this button is extended to form the locking tab of the invention.

It will be appreciated that if the button is fully depressed into the motor housing, the drive-shaft locking facility will be engaged at the same time as the motor housing locking means is released. It is possible, by suitable configuration of the button, to predetermine whether it is essential to lock the drive shaft before the motor housing is released. The optional selection of such a feature provides a further security measure in that it becomes impossible to remove an operating motor housing from the base.

The invention further provides a locking tab as described above which may be fitted to a plunge router motor housing in place of the drive-shaft lock button. The locking tab may be so designed as to be fittable to existing routers.

The invention will be described further, by way of example only, with reference to the accompanying drawings, in which:

FIG. 3A is a plan view of a support plate used in the invention;

FIG. 3B is a plan view of a lock plate according to the invention; and

FIG. 4 is a sectional view of a button according to the invention.

Figure 1:
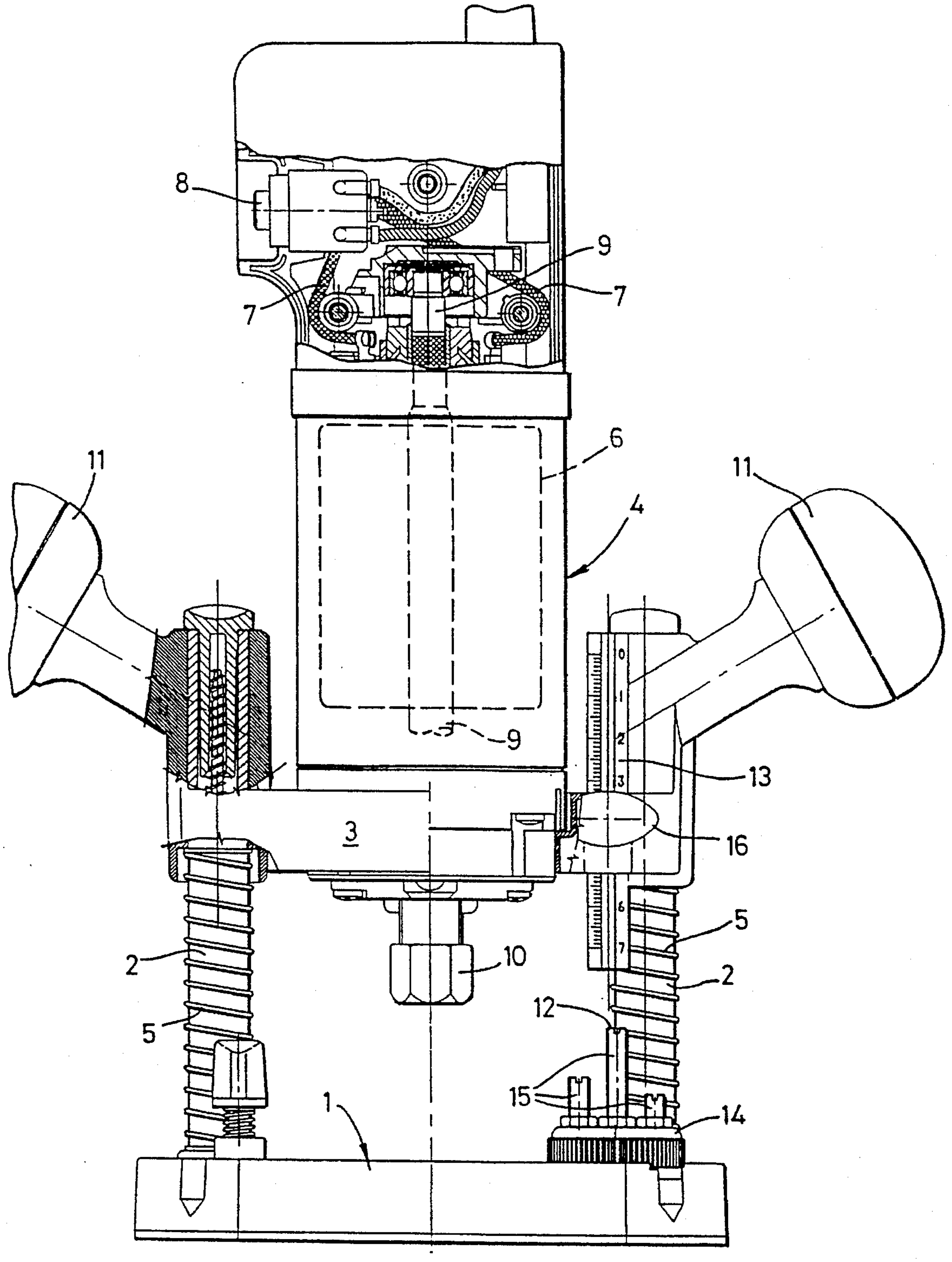
FIG. 1 is a front, partly cut-away view of a plunge-type router.

Referring first to FIG. 1, a plunge-type router is shown having a base 1 from which extend vertical pillars 2. An annular support plate 3 locates a motor pack 4 on the support pillars and is biassed away from the base 1 by springs 5.

The motor pack comprises an electric motor 6 receiving AC power through cables 7. An on-off switch 8 provides means to control power supply to the motor and switch the device on or off.

The motor 6 drives a drive shaft 9 which extends through the support plate 3 and terminates in a chuck 10 which receives the cutting tool (not shown). In use, the router is plunged by manually depressing handles 11 against the biassing force of springs 5, thereby lowering the cutting tool through base 1 and into contact with the work surface. When pressure on the handles 11 is released, the springs return the cutting tool to its original position.

Figure 2:
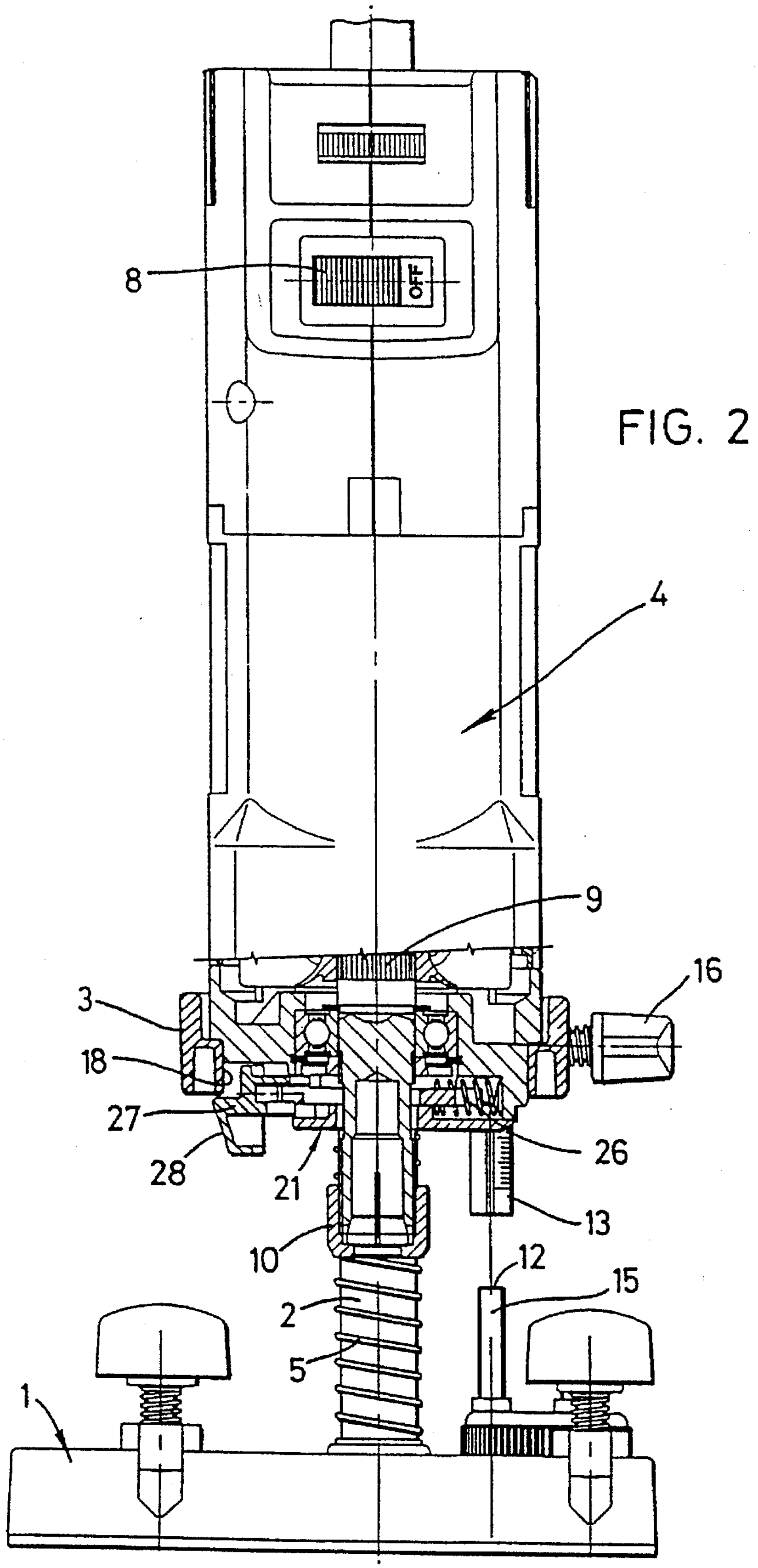
FIG. 2 is a partly cut-away side view of the plunge-type router of FIG. 1 showing locking means according to the invention.

The extent of the movement of the cutting tool through the base 1 is preset by the user by means of depth stop 12 and sliding scale 13 which are fitted between the base and the support plate 3. The depth stop 12 comprises a turret 14 which is fitted with a plurality of rods 15 which extend vertically upwards from the base towards the support plate 3. The sliding scale 13 depends from the plate 3 and abuts with one of the rods 15 when handles 11 are depressed, in order to arrest the movement of the cutting tool through the base 1 at a particular pre-set position. This position may be adjusted either by rotating turret 14 so as to bring a different rod 15, having a greater or lesser length, into abutment with scale 13, or by sliding the scale 13 with respect to the support plate. The scale is clamped in position by means of screw clamping means 16, shown in FIG. 2.

Support plate 3 is shown in plan view in FIG. 3A. The plate comprises twin bores 17 which receive support pillars 2. Bore 18 receives the motor housing and is so dimensioned that the diameter measured within the perimeter 19 of the bore when the clamp bolt 20 is loosened slightly exceeds the diameter of the motor housing, thereby allowing insertion and removal of the motor housing. Tightening of the clamp bolt 20 reduces the diameter of bore 18, thus clamping the motor housing to the support plate.

Located below the support plate 3 is drive shaft lock 21, a plan view of which is shown in FIG. 3B. The drive shaft lock 21 comprises a lock plate 22 which has cut-away sections 23 and 24. Section 23 is of sufficient dimensions to allow drive shaft 9 to rotate freely. Section 24, however, is of restricted dimensions and is so formed as to engage the flats 25 provided on drive shaft 9 when brought into engagement therewith.

A spring 26 biasses the lock plate 22 into a free position such that the drive shaft 9 is able to rotate freely within section 23. In order to lock the drive shaft, the operator depresses button 27, thereby moving the lock plate 22 against the biassing force of the spring 26. The flats 25 will be engaged by section 24. If necessary, the flats may be aligned with the section by rotating the drive shaft, for example by manually turning the chuck 10.

Button 27 is so configured as to extend beyond the perimeter of the annular bore in the support plate 3. The tolerance between the support plate bore 18 and the motor housing is so defined that, even when support plate clamping bolt 20 is loose, button 27 prevents the motor housing from being removed from the support plate bore. In order to remove the motor housing intentionally, the operator must depress button 27, simultaneously sliding the motor housing upwardly free of the support plate.

Button 27 itself is configured so as to present an arcuate angled surface 28 to the support plate for re-insertion into the support plate bore 18. This is shown in detail in FIG. 4. In order to insert the motor housing into the support plate, therefore, the operator simply presses the housing home into the support plate bore 18. The button 27 is automatically depressed through the co-operation of the arcuate surface 28 with the perimeter 19 of the bore 18. When button 27 has passed through the bore, spring 26 returns the button to its extended position, thereby locking the motor housing into the support plate bore.

It will of course be understood that the present invention has been described above purely by way of example, and that modifications of detail can be made within the scope of the invention.

I claim:

1. A plunge-type router comprising a motor housing having a driving motor provided therein, a motor drive shaft coupled for rotation by the driving motor, a base having a workpiece-engaging flange member and a support plate axially movable with respect to the flange member along substantially perpendicular guide means, the support plate being biased away from the flange member and provided with a bore to receive the motor housing and clamping means to secure the housing in the bore, and locking means effective to prevent undesired separation of the motor housing from the support plate.

2. A plunge-type router according to claim 1, wherein the locking means comprise a tab extending radially from the motor housing so as to prevent movement of the housing through the bore in the support plate when the clamping means are disengaged.

3. A plunge-type router according to claim 2, wherein the tab is located between the support plate and the workpiece-engaging flange member, and is movable from an extended position into a retracted position in which the motor housing may be withdrawn from the support plate.

4. A plunge-type router according to claim 3, further including biasing means for urging the tab into the extended position.

5. A plunge-type router according to claim 2, wherein the tab has a tapered profile.

6. A plunge-type router according to claim 2, wherein the tab forms an extension of a motor drive-shaft locking means.

7. A plunge-type router according to claim 6, wherein the drive shaft locking means comprise a flat-engaging member which is movable from a free position into a locking position in which it engages a flat on the motor drive shaft and prevents its rotation by depressing a button on the extension of the motor drive-shaft locking means radially inwards, and wherein the tab is formed as an extension of said button.

8. A plunge-type router according to claim 7, wherein the motor drive-shaft locking means and the tab are so configured that the motor drive-shaft lock is engaged as the tab is moved, to release the motor housing.

9. A plunge-type router according to claim 2, wherein the tab forms a drive-shaft lock button of a motor drive-shaft locking means.

* * * * *